US010055799B2

(12) United States Patent
Banatwala et al.

(10) Patent No.: US 10,055,799 B2
(45) Date of Patent: *Aug. 21, 2018

(54) ALLOWING A USER TO VIEW NETWORK CONTACTS OF OTHER USERS WHEN VISITING AN ENVIRONMENT OF A DIFFERENT ORGANIZATION

(71) Applicant: International Business Machines Corporation, Armonk, NY (US)

(72) Inventors: Mustansir Banatwala, Hudson, NH (US); David A. Brooks, Arlington, MA (US); David L. Durazzano, Hooksett, NH (US); Amy D. Travis, Arlington, MA (US)

(73) Assignee: International Business Machines Corporation, Armonk, NY (US)

(*) Notice: Subject to any disclaimer, the term of this patent is extended or adjusted under 35 U.S.C. 154(b) by 1017 days.

This patent is subject to a terminal disclaimer.

(21) Appl. No.: 14/481,143

(22) Filed: Sep. 9, 2014

(65) Prior Publication Data

US 2015/0193890 A1    Jul. 9, 2015

Related U.S. Application Data

(63) Continuation of application No. 14/149,095, filed on Jan. 7, 2014, now Pat. No. 9,684,937.

(51) Int. Cl.
*G06Q 30/02* (2012.01)
*G06Q 10/10* (2012.01)
(Continued)

(52) U.S. Cl.
CPC ........... *G06Q 50/01* (2013.01); *G06Q 10/105* (2013.01); *G06Q 30/0281* (2013.01);
(Continued)

(58) Field of Classification Search
CPC ... G06Q 10/105; G06Q 50/01; G06Q 30/0281
(Continued)

(56) References Cited

U.S. PATENT DOCUMENTS 7,003,546 B1    2/2006  Cheah
7,613,695 B1    11/2009 Solomon et al.
(Continued)

FOREIGN PATENT DOCUMENTS

WO    2005116979 A2    12/2005

OTHER PUBLICATIONS

Office Action for U.S. Appl. No. 14/149,095 dated Jul. 21, 2016, pp. 1-24.
(Continued)

*Primary Examiner* — Jonathan P Ouellette
(74) *Attorney, Agent, or Firm* — Robert A. Voigt, Jr.; Winstead, P.C.

(57) ABSTRACT

A method, system and computer program product for allowing a user to view network contacts of other users when visiting an environment of a different organization. A visitor requests to view a profile of a user while the visitor is visiting the environment or tenant space of a different organization. The organization of the visitor is obtained. Furthermore, the organization and network contacts of the user whose profile is requested to be viewed are obtained in response to validating the visitor's organization. The requested profile is then displayed to the visitor containing the accessible network contacts (if any) of the user based on whether the user and the visitor belong to the same organization.

10 Claims, 4 Drawing Sheets

(51) Int. Cl.
*G06Q 99/00* (2006.01)
*G06Q 50/00* (2012.01)
*H04L 12/58* (2006.01)
*H04L 29/08* (2006.01)
*H04L 29/06* (2006.01)

(52) U.S. Cl.
CPC .............. *H04L 51/22* (2013.01); *H04L 51/32* (2013.01); *H04L 65/403* (2013.01); *H04L 67/306* (2013.01)

(58) Field of Classification Search
USPC .................................................. 705/1.1–912
See application file for complete search history.

(56) References Cited

U.S. PATENT DOCUMENTS

| | | | | |
|---|---|---|---|---|
| 7,966,369 | B1* | 6/2011 | Briere | G06Q 10/10 707/616 |
| 8,117,201 | B2* | 2/2012 | Bhattacharjee | G06Q 10/10 707/736 |
| 8,244,851 | B1 | 8/2012 | Postoaca | |
| 2001/0002469 | A1 | 5/2001 | Bates et al. | |
| 2002/0124188 | A1 | 9/2002 | Sherman et al. | |
| 2004/0128322 | A1 | 7/2004 | Nagy | |
| 2004/0215793 | A1 | 10/2004 | Ryan et al. | |
| 2005/0091272 | A1 | 4/2005 | Smith et al. | |
| 2005/0273378 | A1 | 12/2005 | MacDonald-Korth et al. | |
| 2007/0088741 | A1 | 4/2007 | Brooks et al. | |
| 2008/0133580 | A1* | 6/2008 | Wanless | H04L 29/12122 |
| 2008/0301237 | A1 | 12/2008 | Parsons et al. | |
| 2009/0080635 | A1 | 3/2009 | Altberg et al. | |
| 2009/0106822 | A1 | 4/2009 | Obasanjo et al. | |
| 2010/0223097 | A1 | 9/2010 | Kramer et al. | |
| 2010/0241971 | A1 | 9/2010 | Zuber | |
| 2010/0306185 | A1 | 12/2010 | Smith et al. | |
| 2011/0119230 | A1 | 5/2011 | Zuber | |
| 2011/0238760 | A1 | 9/2011 | Kuruganti et al. | |
| 2011/0289011 | A1 | 11/2011 | Hull et al. | |
| 2011/0314520 | A1 | 12/2011 | Olszewski et al. | |
| 2012/0089550 | A1 | 4/2012 | Arora et al. | |
| 2012/0110087 | A1 | 5/2012 | Culver et al. | |
| 2012/0198358 | A1 | 8/2012 | Carrer et al. | |
| 2012/0233259 | A1 | 9/2012 | Work | |
| 2012/0254142 | A1 | 10/2012 | Knowlton et al. | |
| 2013/0007126 | A1 | 1/2013 | Ziemann | |
| 2013/0024513 | A1 | 1/2013 | Sacks et al. | |
| 2013/0041912 | A1 | 2/2013 | Arora et al. | |
| 2013/0262207 | A1 | 10/2013 | Miskell | |
| 2015/0112880 | A1 | 4/2015 | Blaylock, IV et al. | |

OTHER PUBLICATIONS

Office Action for U.S. Appl. No. 14/149,095 dated Mar. 21, 2016, pp. 1-25.

* cited by examiner

ALLOWING A USER TO VIEW NETWORK CONTACTS OF OTHER USERS WHEN VISITING AN ENVIRONMENT OF A DIFFERENT ORGANIZATION

TECHNICAL FIELD

The present invention relates generally to social network services, and more particularly to allowing a user to view the network contacts of other users, such as the network contacts of other employees in the same organization, when visiting an environment or tenant space of a different organization.

BACKGROUND

A social network service is an online service, platform or site that focuses on building and reflecting of social networks or social relations among people (e.g., those who share interests and/or activities). A social network service essentially consists of a representation of each user (often a profile), his/her social links, and a variety of additional services. Most social network services are web based and provide means for users to interact over the Internet, such as by e-mail and instant messaging. Social networking sites allow users to share ideas, activities, events, and interests within their individual networks.

In a multi-tenant social networking environment, where a tenant is an organization, a user of an organization may want to engage in collaborative activity (e.g., chatting, participating in an online meeting, sharing files, entering data in forums and wikis, community membership) with users who are visitors from other organizations.

Typically, when a user is visiting the environment or tenant space of a different organization, the visitor will not be able to peruse through the host organization's employee directory, such as the profiles of the employees of the host organization. Neither will the visitor be able to view the network contacts of any user when visiting the environment of the host organization, even the network contacts of other users that are employees of the same organization who are also visiting the environment of the host organization, due to privacy concerns by the host organization. For example, if a first user, who is an employee of a first organization, engages in collaborative activity with a second user of a second organization, the first user will not be able to view the network contacts of other users, including other users that are employees of the first organization who are also engaged in collaborative activity with the second organization.

As a result of not allowing visitors to view the network contacts of any user when visiting the environment of the host organization, even the network contacts of other users that are employees of the same organization, an opportunity is missed to allow the visitor to identify contacts that are also known by other employees of the same organization as well as to expand his/her network contacts in the visiting organization. For example, other employees of the same organization may know other users in the visiting organization that may be used to expand the visitor's network contacts in the visiting organization.

BRIEF SUMMARY

In one embodiment of the present invention, a method for allowing a user to view network contacts of other users when visiting an environment of a different organization comprises receiving a request from a visitor of a first organization to view a profile of a user. The method further comprises obtaining an organization of the visitor. The method additionally comprises obtaining an organization and network contacts of the user whose profile is requested to be viewed. Furthermore, the method comprises providing, by a processor, access to all network contacts of the user to the visitor in response to the user and the visitor being in a same organization. In addition, the method comprises displaying the requested profile of the user containing all of the network contacts of the user to the visitor in response to the user and the visitor being in the same organization.

Other forms of the embodiment of the method described above are in a system and in a computer program product.

In another embodiment of the present invention, a method for allowing a user to view network contacts of other users when visiting an environment of a different organization comprises receiving a request from a visitor of a first organization to view a profile of a user. The method further comprises obtaining an organization of the visitor. The method additionally comprises obtaining an organization and network contacts of the user whose profile is requested to be viewed. Furthermore, the method comprises determining a status of the visitor with respect to the user. Additionally, the method comprises reviewing policies of the profile to determine which network contacts are to be displayed to the visitor based on the status of the visitor. The method further comprises providing, by a processor, access to network contacts of the user determined to be accessible by the visitor based on the policies of the profile and the status of the visitor. In addition, the method comprises displaying the requested profile of the user to the visitor, where the profile contains the network contacts of the user determined to be accessible by the visitor based on the policies of the profile and the status of the visitor.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for allowing a user to view network contacts of other users when visiting an environment of a different organization. In one embodiment of the present invention, a visitor engages in collaborative activity with another user in an environment or tenant space of a different organization. A request is received from the visitor to view a profile of a user while the visitor is collaborating with a user of the host organization, where the user, whose profile is being requested to be viewed by the visitor, could be the same person collaborating with the visitor or a different user. The organization of the visitor is obtained. Furthermore, the organization and network contacts of the user whose profile is requested to be viewed are obtained in response to validating the visitor's organization. Access to all the network contacts of the user is provided to the visitor in response to the user and the visitor being in a same organization. Alternatively, access to only those network contacts of the user (if any) that are employees of the visitor's organization are provided to the visitor in response to the user and the visitor not being in the same organization. The requested profile is then displayed to the visitor containing the accessible network contacts of the user. In this manner, the visitor may be able to view the network contacts of other employees in the same organization and/or identify other coworkers who also have a relationship with an employee of the visitor's organization thereby expanding the visitor's network contacts and expanding the visitor's knowledge of which coworkers have a relationship with an employee of the visitor's organization.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
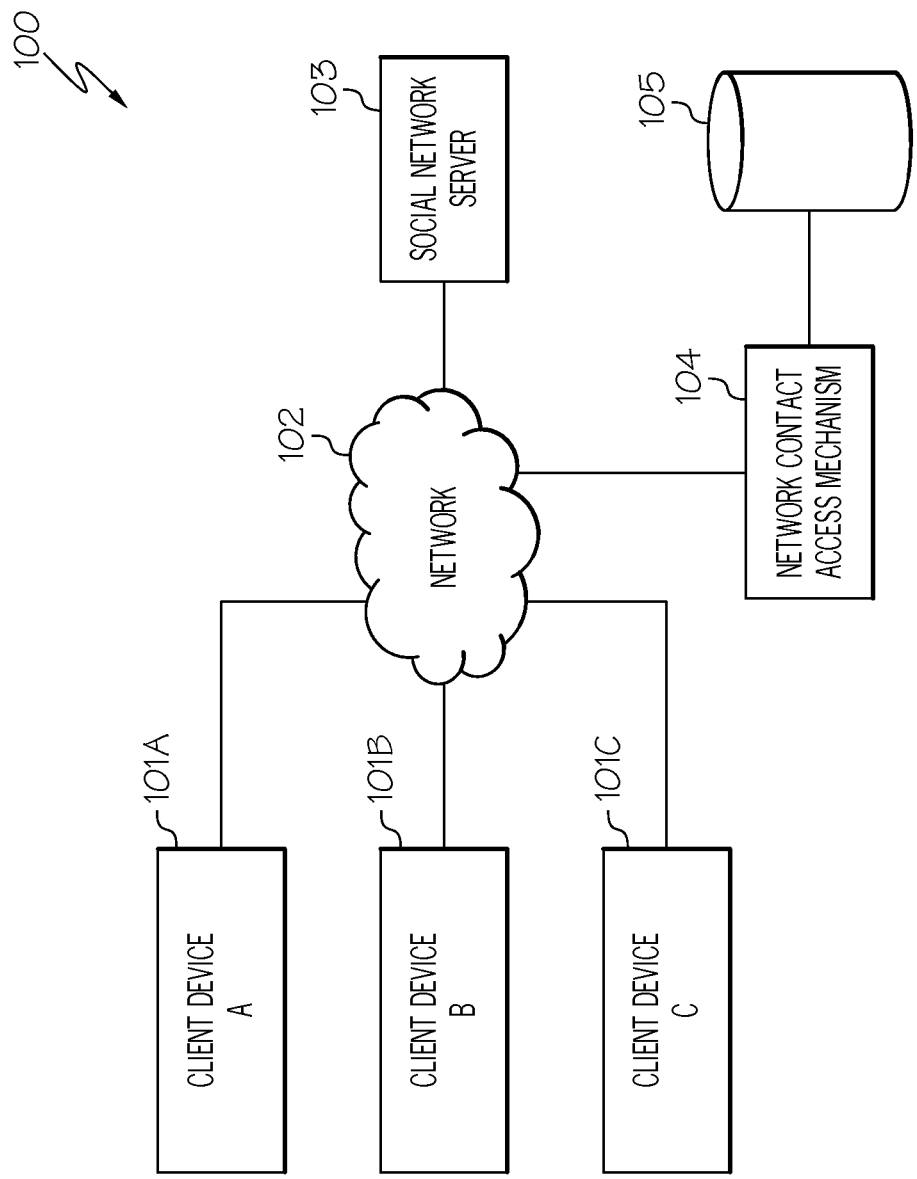
FIG. 1 illustrates a multi-tenant social network system configured in accordance with an embodiment of the present invention.

Referring now to the Figures in detail, FIG. 1 illustrates a multi-tenant social network system 100 configured in accordance with an embodiment of the present invention. Referring to FIG. 1, social network system 100 includes a community of users of various organizations (tenants) using client devices 101A-101C (identified as "Client Device A," "Client Device B," and "Client Device C," respectively, in FIG. 1) to be involved in multi-tenant social network system 100. Client devices 101A-101C may collectively or individually be referred to as client devices 101 or client device 101, respectively. Each user of client device 101 may be a worker/employee for a unique organization or multiple users of client devices 101 may be workers/employees for the same organization. For example, users of client devices 101A-101B may be workers/employees for the same organization while the user of client device 101C is a worker/employee of a different organization. Client device 101 may be a portable computing unit, a Personal Digital Assistant (PDA), a smartphone, a laptop computer, a mobile phone, a navigation device, a game console, a desktop computer system, a workstation, an Internet appliance and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. Social network server 103, as used herein, is configured to enable various collaborative activities among the users of client devices 101. While FIG. 1 illustrates a single social network server 103, it is noted for clarity that multiple servers may be used to implement the social networking and/or microblogging service.

System 100 further includes a network contact access mechanism 104 connected to network 102 by wire or wirelessly. Network contact access mechanism 104 is configured to allow a user to view the network contacts of other users, such as the network contacts of other employees in the same organization, when visiting the environment of a different organization as discussed in further detail below. A description of the hardware configuration of network contact access mechanism 104 is provided below in connection with FIG. 2.

System 100 additionally includes a database 105 configured to store profiles of users, which may be logically separated by organization. Profiles, as used herein, include electronic business cards and any other visual display of data, such as business information, associated with a specific user. Profiles may include information, such as a photograph, a name, an e-mail address, a phone number, a department, an organization, etc., that may be deemed to be public and available to anyone. Profiles may further include information, such as the network contacts for that user, which may only be available to other users based on their status (e.g., employee of same organization) with respect to the user of the profile governed by the policies established by the user of the profile. In one embodiment, a portion or the entirety of the user's network contacts may be made available based on the status of the visitor with respect to the user as governed by the policies of the profile. "Policies," as used herein, refer to the rules or protocols that guide the decision as to which network contacts are to be accessible by the visitor based on the status of the visitor. For example, if the visitor is an employee of a different organization than the user, then the visitor may only be able to view the network contacts of the user who are also employees of the visitor's organization according to the policies of the profile. In another example, if the visitor is an employee of the same organization as the user, then the visitor may be able to view all of the network contacts of the user according to the policies of the profile. In a further example, the user may have a setting or policy that only allows particular network contacts to be viewed by the visitor even if the visitor is an employee of the same organization as the user. For instance, the user may desire some of the contacts to be private and not publicly known. In another example, the user may have a setting or policy that allows the visitor to view the network contacts of the user who are visitors from a different organization.

System 100 is not to be limited in scope to any one particular network architecture. System 100 may include any number of client devices 101, networks 102, social network servers 103, network contact access mechanisms 104 and databases 105. Furthermore, in one embodiment, network contact access mechanism 104 may be part of social network server 103.

Figure 2:
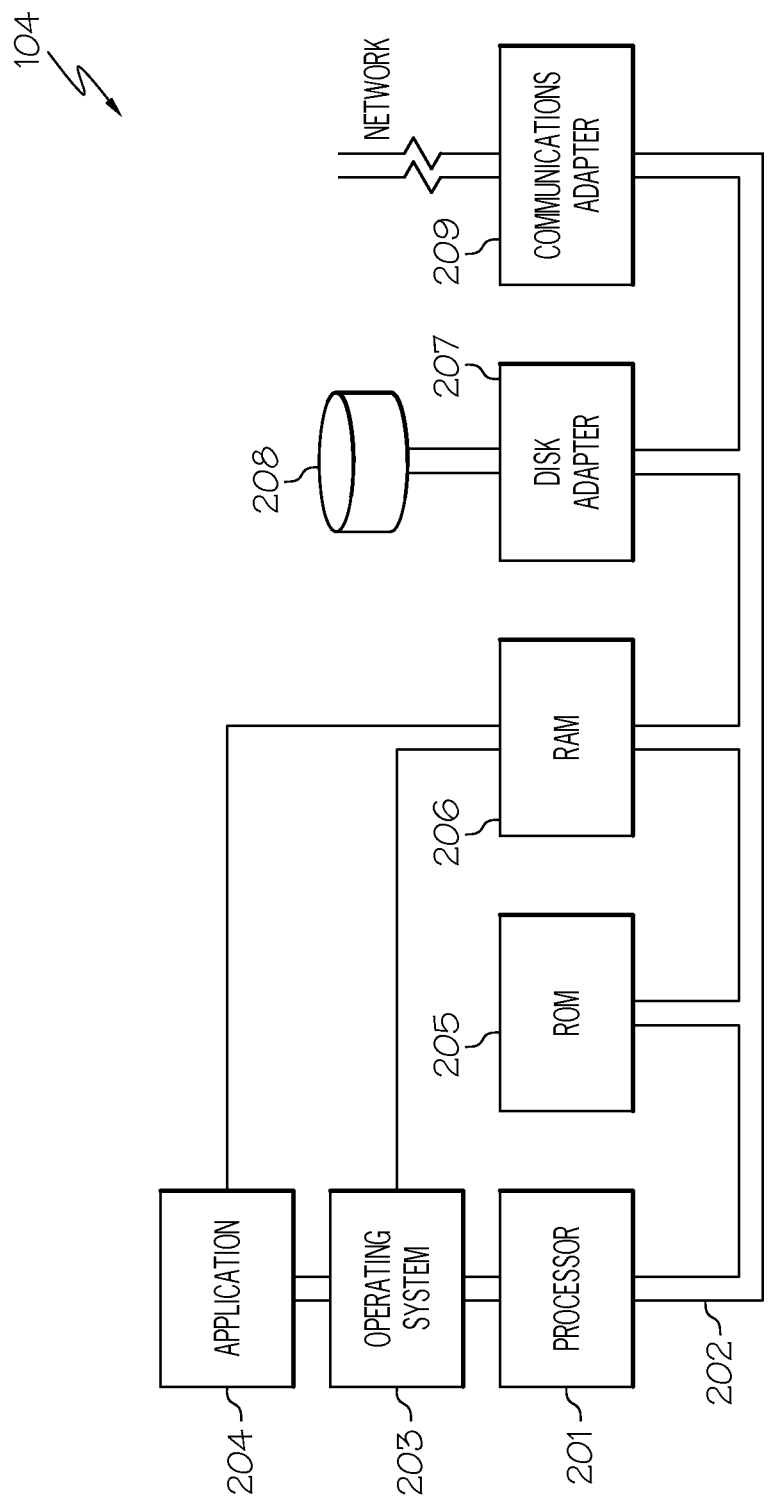
FIG. 2 illustrates a hardware configuration of a network contact access mechanism configured in accordance with an embodiment of the present invention.

Referring now to FIG. 2, FIG. 2 illustrates a hardware configuration of network contact access mechanism 104 (FIG. 1) which is representative of a hardware environment for practicing the present invention. Referring to FIG. 2, network contact access mechanism 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for allowing a user to view network contacts, such as the network contacts of other employees in the same organization, when visiting the environment of another organization, as discussed further below in association with FIGS. 3-4.

Referring again to FIG. 2, read-only memory ("ROM") 205 is coupled to system bus 202 and includes a basic input/output system ("BIOS") that controls certain basic functions of network contact access mechanism 104. Random access memory ("RAM") 206 and disk adapter 207 are also coupled to system bus 202. It should be noted that software components including operating system 203 and application 204 may be loaded into RAM 206, which may be network contact access mechanism's 104 main memory for execution. Disk adapter 207 may be an integrated drive electronics ("IDE") adapter that communicates with a disk unit 208, e.g., disk drive. It is noted that the program for allowing a user to view network contacts, such as the network contacts of other employees in the same organization, when visiting the environment of another organization, as discussed further below in association with FIGS. 3-4, may reside in disk unit 208 or in application 204.

Network contact access mechanism 104 may further include a communications adapter 209 coupled to bus 202. Communications adapter 209 interconnects bus 202 with an outside network (e.g., network 102 of FIG. 1) thereby allowing network contact access mechanism 104 to communicate with client devices 101 and social network server 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As stated in the Background section, in a multi-tenant social networking environment, where a tenant is an organization, a user of an organization may want to engage in collaborative activity (e.g., chatting, participating in an online meeting, sharing files, entering data in forums and wikis, community membership) with users who are visitors from other organizations. Typically, when a user is visiting the environment of a different organization, the visitor will not be able to peruse through the host organization's employee directory, such as the profiles of the employees of the host organization. Neither will the visitor be able to view the network contacts of any user when visiting the environment of the host organization, even the network contacts of other users that are employees of the same organization who are also visiting the environment of the host organization, due to privacy concerns by the host organization. As a result of not allowing visitors to view the network contacts of any user when visiting the environment of the host organization, even the network contacts of other users that are employees of the same organization, an opportunity is missed to allow the visitor to identify contacts that are also known by other employees of the same organization as well as to expand his/her network contacts in the visiting organization. For example, other employees of the same organization may know other users in the visiting organization that may be used to expand the visitor's network contacts in the visiting organization.

Figure 3:
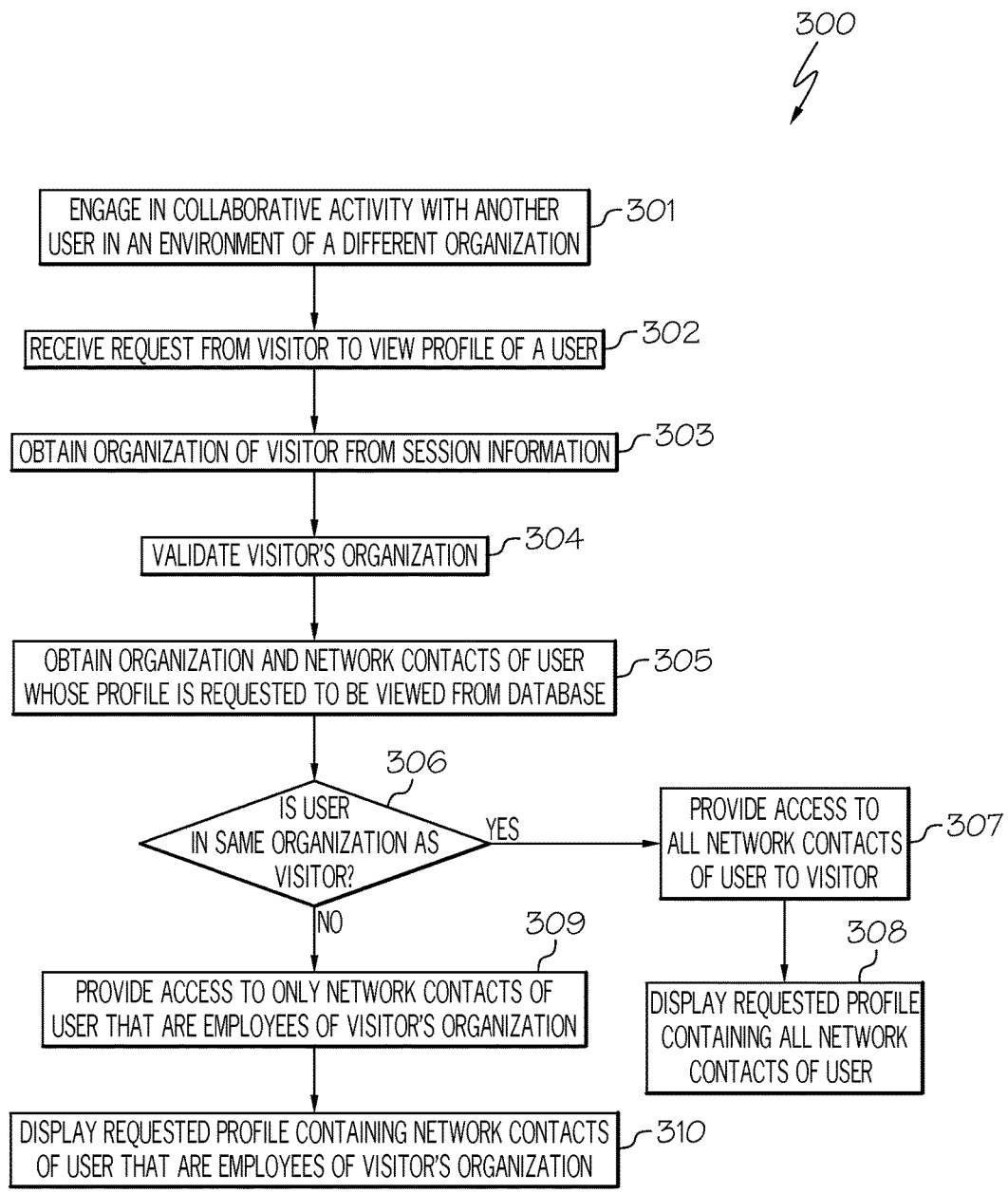
FIG. 3 is a flowchart of a method for allowing a user to view the network contacts of other users, such as the network contacts of other employees in the same organization, when visiting the environment of a different organization in accordance with an embodiment of the present invention.
Figure 4:
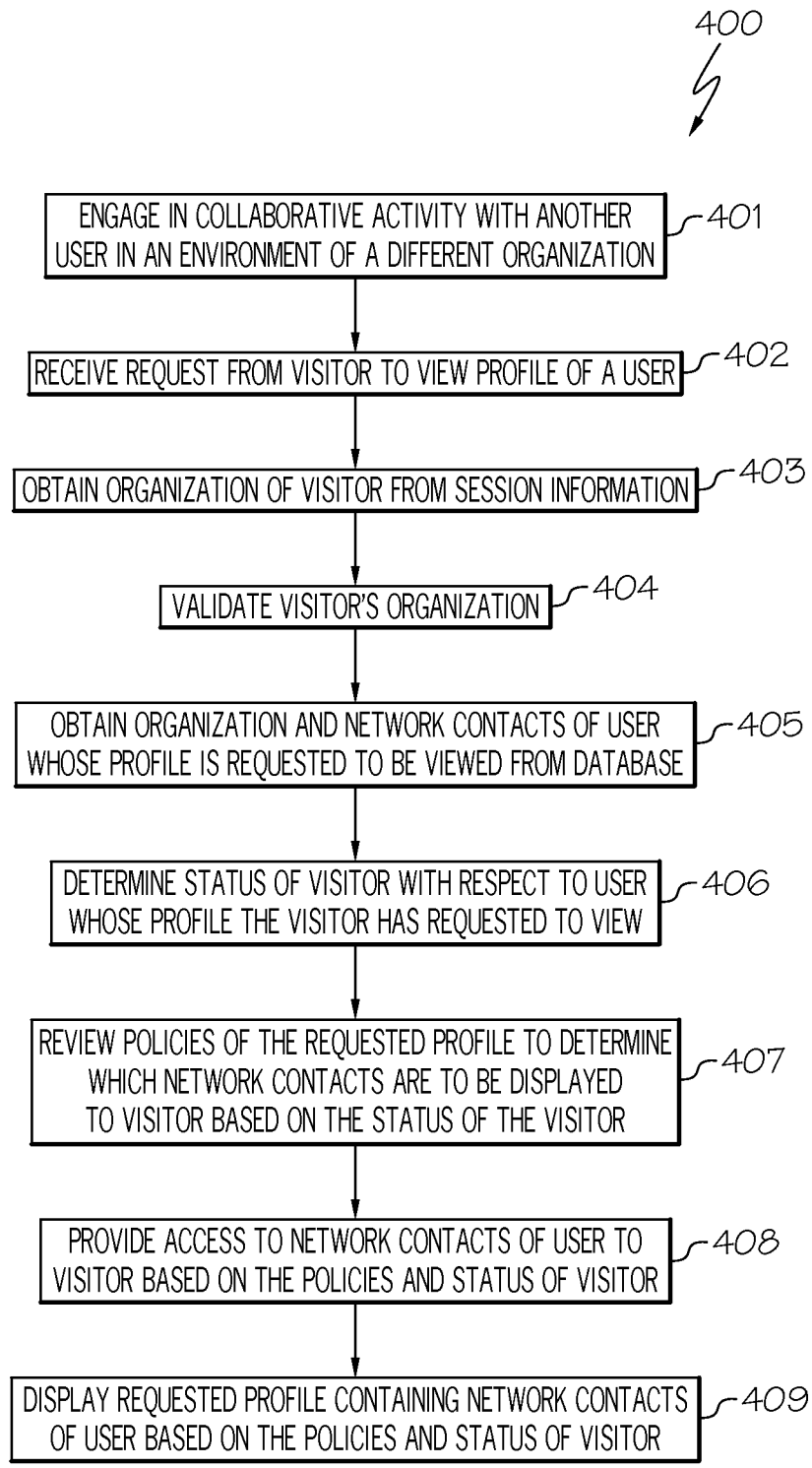
FIG. 4 is a flowchart of an alternative method for allowing a user to view the network contacts of other users, such as the network contacts of other employees in the same organization, when visiting the environment of a different organization in accordance with an embodiment of the present invention.

The principles of the present invention provide a means for allowing the a user to view network contacts, such as the network contacts of other employees in the same organization, when visiting the environment of a different organization as discussed further below in association with FIGS. 3-4. FIG. 3 is a flowchart of a method for allowing a user to view the network contacts of other users, such as the network contacts of other employees in the same organization, when visiting the environment of a different organization. FIG. 4 is a flowchart of an alternative method for allowing a user to view the network contacts of other users, such as the network contacts of other employees in the same organization, when visiting the environment of a different organization.

As stated above, FIG. 3 is a flowchart of a method 300 for allowing a user to view the network contacts of other users when visiting the environment or tenant space of a different organization in accordance with an embodiment of the present invention.

Referring to FIG. 3, in conjunction with FIGS. 1-2, in step 301, the visitor (e.g., user of client device 101A) engages in collaborative activity (e.g., chatting, participating in an online meeting, sharing files, entering data in a forum, entering data in a wiki) with another user (e.g., user of client device 101B) in an environment or tenant space of a different organization (i.e., an organization that is a different organization than the organization that employs the visitor).

In step 302, network contact access mechanism 104 receives a request from the visitor (e.g., user of client device 101A) to view the profile of a user (e.g., user of client device 101B), where the user could be the same person collaborating with the visitor in step 301 or a different user.

In step 303, network contact access mechanism 104 obtains the organization of the visitor, such as from session information. That is, network contact access mechanism 104 obtains the organization of the visitor from the information exchanged between client devices 101 of the visitor and the user (user of step 301) during the session between the visitor and the user (user of step 301).

In step 304, network contact access mechanism 104 validates the organization of the visitor.

In step 305, network contact access mechanism 104 obtains the organization and network contacts of the user whose profile the visitor has requested to view in response to validating the organization of the visitor. In one embodiment, network contact access mechanism 104 obtains such information from database 105.

In step 306, a determination is made by network contact access mechanism 104 as to whether the visitor is an employee of the same organization as the user (i.e., the user whose profile the visitor has requested to be viewed).

If the user is in the same organization as the visitor, then, in step 307, network contact access mechanism 104 provides access to all network contacts of the user to the visitor. In step 308, network contact access mechanism 104 displays to the visitor the requested profile containing all of network contacts of the user. In this manner, the visitor is able to view the network contacts of other employees in the same organization when both are visiting the environment of a different organization. As a result, the visitor may be able to expand his/her network contacts in the visiting organization by identifying other contacts of the visiting organization that are known by other colleagues.

If, however, the user is not in the same organization as the visitor, then, in step 309, network contact access mechanism 104 provides access to only those network contacts of the user (if any) that are employees of the visitor's organization. In step 310, network contact access mechanism 104 displays to the visitor the requested profile containing only those network contacts of the user (if any) that are employees of the visitor's organization. In this manner, the visitor is able to identify other coworkers who also have a relationship with an employee of the visitor's organization.

In an alternative embodiment, network contact access mechanism 104 may determine which network contacts are to be displayed in the requested profile based on the status of the visitor with respect to the user whose profile is being requested to be viewed as well as based on the policy or setting established by the user whose profile is being requested to be viewed as discussed below in connection with FIG. 4.

FIG. 4 is a flowchart of an alternative method 400 for allowing a user to view the network contacts of other users, such as the network contacts of other employees in the same organization, when visiting the environment or tenant space of a different organization in accordance with an embodiment of the present invention.

Referring to FIG. 4, in conjunction with FIGS. 1-2, in step 401, the visitor (e.g., user of client device 101A) engages in collaborative activity (e.g., chatting, participating in an online meeting, sharing files, entering data in a forum, entering data in a wiki) with another user (e.g., user of client device 101B) in an environment or tenant space of a different organization (i.e., an organization that is a different organization than the organization that employs the visitor).

In step 402, network contact access mechanism 104 receives a request from the visitor (e.g., user of client device 101A) to view the profile of a user (e.g., user of client device 101B), where the user could be the same person collaborating with the visitor in step 401 or a different user.

In step 403, network contact access mechanism 104 obtains the organization of the visitor, such as from session information. That is, network contact access mechanism 104 obtains the organization of the visitor from the information exchanged between client devices 101 of the visitor and the user (user of step 401) during the session between the visitor and the user (user of step 401).

In step 404, network contact access mechanism 104 validates the organization of the visitor.

In step 405, network contact access mechanism 104 obtains the organization and network contacts of the user whose profile the visitor has requested to view in response to validating the visitor's organization. In one embodiment, network contact access mechanism 104 obtains such information from database 105.

In step 406, network contact access mechanism 104 determines the status of the visitor (e.g., employee of same organization, a visitor) with respect to the user whose profile the visitor has requested to view.

In step 407, network contact access mechanism 104 reviews the policies of the requested profile to determine which network contacts of the user (the user whose profile the visitor has requested to view) are to be displayed to the visitor based on the status of the visitor.

In step 408, network control access mechanism 104 provides access to the network contacts of the user (if any) to the visitor based on the policies and status of the visitor. For example, a portion or the entirety of the user's network contacts may be made available based on the status of the visitor with respect to the user as governed by the policies of the profile. For example, if the visitor is an employee of a different organization than the user, then the visitor may only be able to view the network contacts who are also employees of the visitor's organization according to the policies of the profile. In another example, if the visitor is an employee of the same organization as the user, then the visitor may be able to view all of the network contacts of the user according to the policies of the profile. In a further example, the user may have a setting or policy that only allows particular network contacts to be viewed by the visitor even if the visitor is an employee of the same organization as the user. For instance, the user may desire some of the contacts to be private and not publicly known. In another example, the user may have a setting or policy that allows the visitor to view only the network contacts of the user who are visitors from a different organization if the user and the visitor are employees of the same organization.

In step 409, network contact access mechanism 104 displays to the visitor the requested profile containing the network contacts of the user (if any) to the visitor based on the policies and status of the visitor. In this manner, the visitor may be able to view the network contacts of other employees in the same organization and/or identify other coworkers who also have a relationship with an employee of the visitor's organization thereby expanding the visitor's network contacts and expanding the visitor's knowledge of which coworkers have a relationship with an employee of the visitor's organization.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for allowing a user to view network contacts of other users when visiting an environment of a different organization, the method comprising:

receiving a request, by a network contact access mechanism in a multi-tenant social networking environment, from a visitor of a first organization using a client device to view a profile of another user;

responsive to receiving said request, obtaining, by said network contact access mechanism, said first organization of said visitor;

obtaining, by said network contact access mechanism, a second organization and network contacts of said another user in response to validating said first organization of said visitor;

determining, by said network contact access mechanism, whether said first organization and said second organization are the same organization;

providing, by said network contact access mechanism, access to all obtained network contacts of said another user to said client device of said visitor in response to said first organization and said second organization being the same organization;

displaying said requested profile of said another user containing all of said network contacts of said another user to said visitor in response to said first organization and said second organization being the same organization thereby allowing said visitor to expand his/her network contacts;
providing, by said network contact access mechanism, access to only network contacts of said another user that are employees of said first organization in response to said another user and said visitor not being employees of said first organization; and
displaying said requested profile of said another user containing only network contacts of said another user that are employees of said first organization and not containing other network contacts of said another user that are employees of other organizations in response to said another user and said visitor not being employees of said first organization.

2. The method as recited in claim 1, wherein said first organization of said visitor is obtained from session information.

3. The method as recited in claim 1, wherein said second organization and said network contacts of said another user are obtained from a database.

4. A method for allowing a user to view network contacts of other users when visiting an environment of a different organization, the method comprising:
receiving a request, by a network contact access mechanism in a multi-tenant social networking environment, from a visitor of a first organization using a client device to view a profile of another user;
responsive to receiving said request, obtaining, by said network contact access mechanism, said first organization of said visitor;
obtaining, by said network contact access mechanism, a second organization and network contacts of said another user whose profile is requested to be viewed in response to validating said first organization of said visitor;
determining, by said network contact access mechanism, a status of said visitor with respect to said another user;
reviewing, by said network contact access mechanism, policies of said profile to determine which network contacts are to be displayed to said visitor based on said status of said visitor;
providing, by said network contact access mechanism, access to network contacts of said another user determined to be accessible by said visitor based on said policies of said profile and said status of said visitor; and
displaying said requested profile of said another user to said visitor, wherein said profile contains said network contacts of said another user determined to be accessible by said visitor based on said policies of said profile and said status of said visitor.

5. The method as recited in claim 4, wherein said visitor has access to all of said network contacts of said another user in response to said first organization and said second organization being the same organization.

6. The method as recited in claim 4, wherein said visitor has access to only those network contacts of said another user that are employees of said first organization in response to said first organization not being the same organization as said second organization.

7. The method as recited in claim 4, wherein said visitor has access to only those network contacts of said another user that are designated to be viewed by said visitor in response to said first organization and said second organization being the same organization.

8. The method as recited in claim 4, wherein said visitor has access to those network contacts of said another user that are other visitors from a different organization.

9. The method as recited in claim 4, wherein said first organization of said visitor is obtained from session information.

10. The method as recited in claim 4, wherein said second organization and said network contacts of said another user are obtained from a database.

\* \* \* \* \*